United States Patent [19]

Cirimele

[11] Patent Number: 4,542,051

[45] Date of Patent: Sep. 17, 1985

[54] VARIABLE COLLAGE

[76] Inventor: Alfred P. Cirimele, 844 Solana Dr., Lafayette, Calif. 94549

[21] Appl. No.: 557,840

[22] Filed: Dec. 5, 1983

[51] Int. Cl.[4] .................. B32B 15/02

[52] U.S. Cl. .................. 428/39; 40/489; 40/622; 428/14; 428/256

[58] Field of Search .................. 428/63, 131, 14, 39, 428/256; 40/489, 622, 620

[56] References Cited

U.S. PATENT DOCUMENTS

| | | | |
|---|---|---|---|
| 412,972 | 10/1889 | Mitchell | 428/131 X |
| 722,592 | 3/1903 | Kostka | 40/620 |
| 880,809 | 3/1908 | Moncrief | 40/620 X |
| 1,729,842 | 10/1929 | Pistocco | 428/256 X |
| 2,121,898 | 6/1938 | Young | 40/622 |
| 2,538,958 | 1/1951 | Augenfeld | 40/622 X |
| 2,916,839 | 12/1959 | Wheaton | 40/622 |
| 3,261,393 | 7/1966 | Templeton | 428/63 X |
| 4,163,817 | 8/1979 | DiCarlantonio et al. | 428/131 X |
| 4,222,162 | 9/1980 | Levy et al. | 428/63 X |

*Primary Examiner*—Henry F. Epstein

*Attorney, Agent, or Firm*—Schapp and Hatch

[57] ABSTRACT

A variable collage in which art objects are removably mountable on a rectangular panel of expanded metal held flat by a surrounding frame into which the panel is inset, mounting being accomplished by hooks on the backs of the art objects engageable over the strands of the expanded metal panel.

6 Claims, 3 Drawing Figures

VARIABLE COLLAGE

BACKGROUND OF THE INVENTION

1. Field of the Invention

This invention relates to collages, and more particularly to collages in which art objects are removably mounted on a backing material.

2. Description of the Prior Art

Collages have become a separate art form. A "collage" is a plurality of art objects mounted in a pleasing relationship to each other upon a background material. Until fairly recently, the art objects were glued in place on the background material and hence could not be rearranged or replaced.

Because of the desire of the artist who made the collage, or the owner thereof, to be able to move the separate art objects from place to place on the background, collages have from time to time been made with a flannel backing on the art objects which will adhere to a flannel board background. Such devices do not adhere very well and the art objects often fall off if the background is oriented in a vertical plane such as by hanging on a wall.

Other attempts to make the art objects removable and/or repositionable have involved the use of tacky adhesives on the backs of the art objects and making the background of the collage out of a material to which the adhesive will removably adhere. It has been found, however, that repeated removal and repositioning of such art objects soon results in the adhesive losing its "tack" so that the art objects will no longer adhere where placed.

SUMMARY OF THE INVENTION

The variable collage of the present invention provides for mounting the art objects securely on a novel panel of expanded metal by means of hooks so that the art objects may be readily moved from place to place on the panel and/or removed therefrom. The artist in composing the collage can move the component pieces from place to place on the background panel, adding objects and removing objects as he sees fit. The owner of the variable collage of the present invention also can readily move the component art objects from place to place on the background panel, can remove or add art objects, and hence can vary a collage which has become stale or tiresome and add to or replace the art objects with other art objects to modify the collage in accordance with changing criteria such as the seasons of the year, upcoming holidays, and the like.

To accomplish these purposes, the background panel is made of expanded metal, that is of thin sheet metal having parallel slits arranged in such manner that when the edges of the sheet metal are pulled apart, diamond shaped openings will appear between the crisscrossing strands of unslitted metal. This expanded material is relatively rigid and hence will not distort, nor pull apart when comparatively heavy art objects are mounted thereon.

However, because of the splitting and pulling operations performed to produce expanded metal, it does have a tendency to curl. In order to maintain the expanded metal panel in flat condition, it is secured to a rigid frame capable of retaining it against curling. This frame also provides an attractive appearance and shields the sharp edges of the expanded metal panel.

It is therefore an object of the present invention to provide a variable collage structure in which the art objects making up the collage are securely, but removably, mountable on the background panel.

Another object of the present invention is to provide a device of the character described in which the background panel is relatively rigid and is held against curling by a surrounding frame.

A further object of the present invention is to provide a device of the character described which is sturdy, while at the same time attractive, and is constructed for indefinite use without becoming worn out or inoperative.

Other objects and features of advantage will become apparent as the specification progresses and from the claims.

Figure 1:
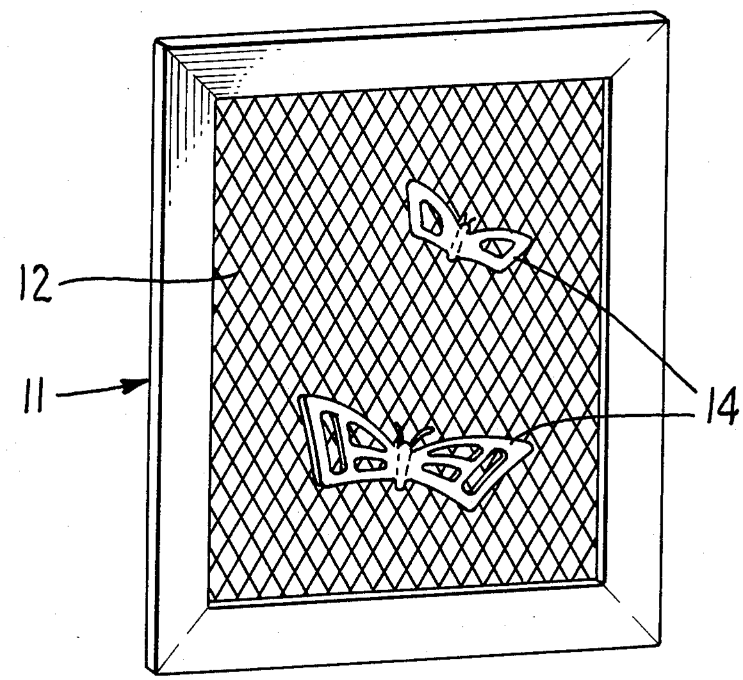
FIG. 1 is a perspective view of a variable collage constructed in accordance with the present invention.

While only the preferred form of the invention is illustrated in the drawings, it will be apparent that various modifications could be made without departing from the ambit of the claims.

DESCRIPTION OF THE PREFERRED EMBODIMENT

As may be seen in the accompanying drawings, the variable collage of the present invention provides a rectangular frame means 11 surrounding a rectangular panel 12 of expanded metal, and mounting means 13 adapted for securing to a variety of art objects 14, the mounting means 13 having hooked portions 16 selectively and releasably engageable with the panel 12 at desired positions.

The frame means 11 may be made of any suitable material, but wood is preferred, both for beauty and for rigidity. Conventional means such as mounting hooks 17 are provided on the frame means 11 for facilitating hanging of frame means 11 in a vertical surface such as a wall (not shown).

Figure 3:
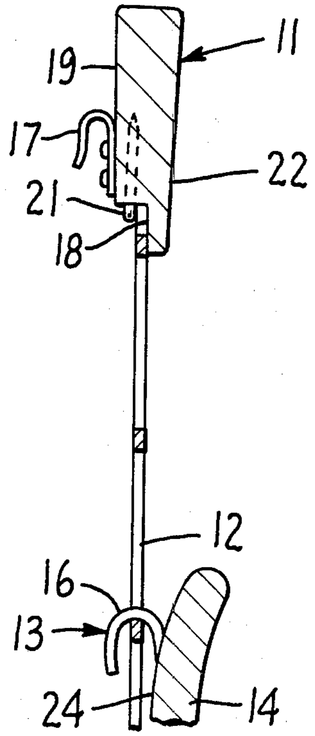
FIG. 3 is a cross sectional view taken substantially on the plane of line 3—3 of FIG. 2.
Figure 2:
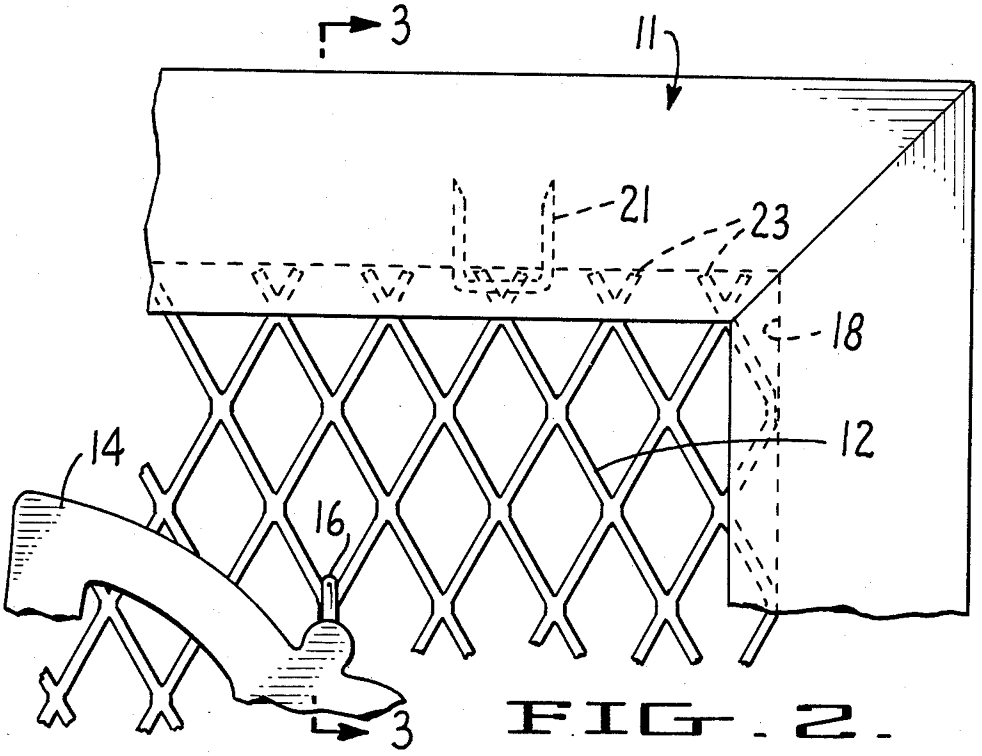
FIG. 2 is an enlarged fragmentary view of a corner portion of the variable collage of FIG. 1, with portions being broken away to conserve space.

In accordance with the present invention, and as here shown, the frame means 11 is formed with a recessed rectangular opening 18 at its rear side 19, with the rectangular opening 18 being sized to receive the rectangular panel 12 of expanded metal. A plurality of staples 21 are driven into frame means 11 out of sight of the front side 22 thereof and rearwardly of the panel 12 (see FIG. 3) for securing the panel 12 in the recess 18 so as to hold the panel 12 flat against unwanted curling.

The art objects 14 are preferably substantially flattened and have the hooks 16 mounted on their rear sides 24. Obviously, any desired art objects small enough to fit onto the panel 12 may be utilized, the drawings illustrating a pair of stylized butterflys. Because of the structure shown and described herein, the art objects 14 may be moved from place to place on the panel 12, or may be removed therefrom. Other art objects may be added and the relative positions changed about until the user is satisfied.

I have found that a person can become so accustomed to seeing a particular collage that it is no longer appreciated. The structure of the present invention makes it possible for the viewer to change the spatial relationships of the various art objects so as to create a fresh perspective. Other art objects may be added to the collage and the various art objects moved or removed until the desired effect is achieved. Each time the art object is moved or removed it is simply lifted vertically so it no longer hangs from hook 16 engaging the panel 12 at the bottom of one of the triangular openings in the expanded metal. Thus, the art objects are so easily hooked on and removed that extensive relocations may be accomplished without undue effort.

I have also found that the user of the device of the present invention can originate collages on various themes (such as Christmas, Easter, 4th of July, Thanksgiving, Halloween, Spring, Summer, Fall, Winter, etc.) and, after the seasonal collage has served its purpose the variable collage can be returned to its original condition.

In view of the foregoing, it will be seen that the variable collage device of the present invention provides an attractive structure for the creation, modification, and revision of collage pictures.

What is claimed is:

1. A variable collage device, comprising:

a panel of expanded metal having diamond shaped openings therethrough and having an inherent tendency to curl, a rigid frame attached to the edges of said panel and formed for holding said panel substantially flat, and mounting means adapted to be secured to a variety of art objects and having hooked portions selectively and releasably engageable with said panel at desired positions.

2. A variable collage device as described in claim 1, and wherein said frame is made of wood and is provided with means for hanging on a wall.

3. A variable collage device as described in claim 1, and wherein said frame is formed with a recess along its inner rear portion for receiving the edges of said panel of expanded metal, and a plurality of staples are mounted in said frame out of sight of the front side thereof in said recess for holding said panel flat against curling.

4. A variable collage device as described in claim 1, and wherein said art objects comprise substantially flat representations of flora and fauna.

5. A variable collage device as described in claim 1, and wherein said mounting means comprises hooks mounted on the rear sides of said art objects for selective insertion through the openings in said expanded metal panel and for selected engagement with the strands of expanded metal forming said panel.

6. A variable collage device, comprising a rectangular wooden frame, a rectangular panel of expanded metal having diamond shaped openings therethrough and mounted in said frame and held against curling thereby with the edges of said panel concealed by said frame, a variety of art objects having generally flat backs, and inverted hooks secured to said generally flat backs of said art objects, said hooks being formed for selective and releasable engagement with said panel at desired positions thereon whereby said art objects may be moved from place to place on said panel and may be selectively mounted thereon and removed therefrom so as to vary the appearance of the collage device.

* * * * *